(12) United States Patent
Meketa et al.

(10) Patent No.: US 8,738,773 B2
(45) Date of Patent: *May 27, 2014

(54) SECURING EVENT FLOW IN A USER INTERFACE HIERARCHY

(75) Inventors: Deneb Meketa, San Francisco, CA (US); Jeffrey Whitney Mott, Greenbrae, CA (US)

(73) Assignee: Adobe Systems Incorporated, San Jose, CA (US)

( * ) Notice: Subject to any disclaimer, the term of this patent is extended or adjusted under 35 U.S.C. 154(b) by 173 days.

This patent is subject to a terminal disclaimer.

(21) Appl. No.: 13/423,079

(22) Filed: Mar. 16, 2012

(65) Prior Publication Data

US 2013/0167158 A1    Jun. 27, 2013

Related U.S. Application Data

(63) Continuation of application No. 11/685,695, filed on Mar. 13, 2007, now Pat. No. 8,166,165.

(51) Int. Cl.
*G06F 15/173* (2006.01)

(52) U.S. Cl.
USPC .......................................................... 709/225

(58) Field of Classification Search
USPC .......................................................... 709/225
See application file for complete search history.

(56) References Cited

U.S. PATENT DOCUMENTS

| | | | |
|---|---|---|---|
| 6,573,907 B1 | 6/2003 | Madrane | |
| 6,687,745 B1 | 2/2004 | Franco et al. | |
| 7,028,306 B2 | 4/2006 | Boloker et al. | |
| 2002/0052955 A1 | 5/2002 | Ebihara et al. | |
| 2002/0194388 A1 | 12/2002 | Boloker et al. | |
| 2004/0239701 A1 | 12/2004 | Crichton | |
| 2005/0071845 A1 | 3/2005 | Kallio et al. | |
| 2005/0108655 A1 | 5/2005 | Andrea et al. | |
| 2006/0184410 A1 | 8/2006 | Ramamurthy et al. | |
| 2008/0098296 A1 | 4/2008 | Brichford et al. | |

OTHER PUBLICATIONS

"Advisory Action", U.S. Appl. No. 11/685,695, (Oct. 6, 2010), 3 pages.
"Final Office Action", U.S. Appl. No. 11/685,695, (Jul. 13, 2010), 11 pages.
"Non-Final Office Action", U.S. Appl. No. 11/685,695, (Jan. 26, 2010), 10 pages.
"Non-Final Office Action", U.S. Appl. No. 11/685,695, (May 12, 2011), 12 pages.
"Non-Final Office Action", U.S. Appl. No. 11/685,695, (Jun. 24, 2009), 10 pages.

(Continued)

*Primary Examiner* — Maceeh Anwari
(74) *Attorney, Agent, or Firm* — Wolfe-SBMC

(57) ABSTRACT

In general, one aspect of the subject matter described in this specification can be embodied in a method for integrating separate software applications in an application execution environment, where the method includes providing a hierarchical structure of nodes corresponding to user interface objects representing elements of a user interface of a computer, wherein the hierarchical structure governs propagation of user interface events among the user interface objects; the providing includes enabling separate software applications to concurrently create nodes in the hierarchical structure and share the user interface; and restricting propagation of user interface events among the user interface objects, during presentation of the user interface objects in the user interface of the computer, based on node ownership information linking the user interface objects to the separate software applications. Other embodiments of this aspect include corresponding systems, apparatus, and computer program products.

31 Claims, 4 Drawing Sheets

(56) References Cited

OTHER PUBLICATIONS

"Notice of Allowance", U.S. Appl. No. 11/685,695, (Dec. 28, 2011), 12 pages.
U.S. Appl. No. 11/685,695, Office Action dated Jun. 24, 2009, 11 pages (to be published by the USPTO).
Hunter, William., Attorney for Assignee, in U.S. Appl. No. 11/685,710, filed Mar. 13, 2007, Response to Office Action submitted Aug. 21, 2009, 24 pages (to be published by the USPTO).
U.S. Appl. No. 11/685,710, Office Action dated Aug. 21, 2009, 22 pages (to be published by the USPTO).
Meketa et al., "Sharing Display Spaces", U.S. Appl. No. 11/685,710, filed Mar. 13, 2007, 28 pages (to be published by the USPTO).
Moock, Colin "ActionScript for Flash MX: The Definitive Guide," 2002, O'Reilly, Second Edition, pp. 339 and 818-821, 6 pages.

SECURING EVENT FLOW IN A USER INTERFACE HIERARCHY

CROSS REFERENCE TO RELATED APPLICATIONS

This application is a continuation application of, and claims priority to, U.S. patent application Ser. No. 11/685,695, entitled "SECURING EVENT FLOW IN A USER INTERFACE HIERARCHY" to Deneb Meketa, filed on Mar. 13, 2007. The disclosure of the above application is incorporated herein by reference in its entirety.

BACKGROUND

The present disclosure relates to programming environments that define a hierarchical object structure to represent the contents of a user interface and, in particular, to event dispatch within such programming environments.

Some programming environments provide definitions for use in creating a hierarchical object structure to represent the contents of a user interface (e.g., buttons, text fields, etc., in a graphical user interface). Each software application can use those definitions to create its own user interface (UI) object hierarchy for presentation to users. Thus, an application can create a hierarchy of UI objects for receiving user input by employing the facility provided by the programming environment, thereby creating a user interface for that software application.

In addition, some programming environments also define a system of events that propagate from an outermost containing UI object, in a hierarchy of UI objects, to the object where an event occurred, and that propagate from an innermost UI object to the outermost UI object. The former type of event dispatch is commonly referred to as event capture, or simply capture, and the latter type of event dispatch is commonly referred to as event bubbling, or simply bubbling. For example, Internet browser JavaScipt engines often provide a capture/bubble event dispatch mechanism for use with a UI element hierarchy.

SUMMARY

This specification describes technologies relating to securing event flow in a user interface hierarchy. In general, one aspect of the subject matter described in this specification can be embodied in a method for integrating separate software applications in an application execution environment, where the method includes providing a hierarchical structure of nodes corresponding to user interface objects representing elements of a user interface of a computer, wherein the hierarchical structure governs propagation of user interface events among the user interface objects; the providing includes enabling separate software applications to concurrently create nodes in the hierarchical structure and share the user interface; and restricting propagation of user interface events among the user interface objects, during presentation of the user interface objects in the user interface of the computer, based on node ownership information linking the user interface objects to the separate software applications.

The application execution environment can include a virtual machine that works in conjunction with an operating system of the computer to provide a software platform on which the separate software applications run, and the method can include creating one or more isolation environments with which the separate software applications are loaded. The method can include recording application owners for the nodes created in the hierarchical structure; and recording publishing authority owners for the separate software applications.

The node ownership information can indicate permissions granted by an owner of the node, and the method can include providing an application programming interface through which the permissions are specified. The method can include receiving from the separate applications, through the application programming interface, information specifying the permissions including at least one permission linked to a user interface event. The method can include receiving from the separate applications, through the application programming interface, information specifying the permissions including at least one permission linked to a user interface object.

The restricting can include, when performing an event dispatch: checking the node ownership information for each node in a path from a target node to a root node in the hierarchical structure, the target node corresponding to a user interface object currently having an input focus; and limiting the event dispatch at an inter-node point in the path where a mutual trust relationship is lacking, with respect to the event dispatch, between an owner of a current node and an owner of the target node. The limiting can include limiting the event dispatch at the inter-node point in the path where a mutual trust relationship is also lacking, with respect to the event dispatch, between the owner of the current node and each additional owner of nodes between the current node and the target node. The owners can include application owners and publishing authority owners. Moreover, the method can include performing event capturing and bubbling for the event dispatch within a proper subset of nodes in the path as defined by the inter-node point and the target node.

Other embodiments include corresponding systems, apparatus, and computer program products. Thus, one aspect of the subject matter described in this specification can be embodied in a computer program product, encoded on a computer-readable medium, operable to cause data processing apparatus to perform operations of the method. Another aspect of the subject matter described in this specification can be embodied in a system including one or more user interface devices; one or more processors coupled with the one or more user interface devices; a computer-readable medium coupled with the one or more processors and having encoded thereon instructions to effect an application execution environment; where the application execution environment is operable to perform operations of the method.

Particular embodiments of the subject matter described in this specification can be implemented to realize one or more of the following advantages. A system of rules can be employed, such that, if different objects in a user interface element hierarchy are owned by separate, mutually distrusting applications, event propagation can be restricted to avoid inappropriate leaks of information about user behavior. Applications created by mutually distrusting parties can be permitted to share a user interface element hierarchy, and use a capture/bubble event distribution mechanism that dispatches events to the separate applications. A containing application can be prevented from eavesdropping on events that occur in a contained application, and a contained application can be prevented from triggering a containing application's event-handling logic, unless both sides agree to permit such interactions. Thus, mutually distrusting applications, written by mutually distrusting parties, can be tightly integrated to share a common hierarchy of user interface elements, without vulnerability to each other, rather than being separated by being placed in separate windows or frames, where event propagation does not cross the boundaries imposed by such windows and frames.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
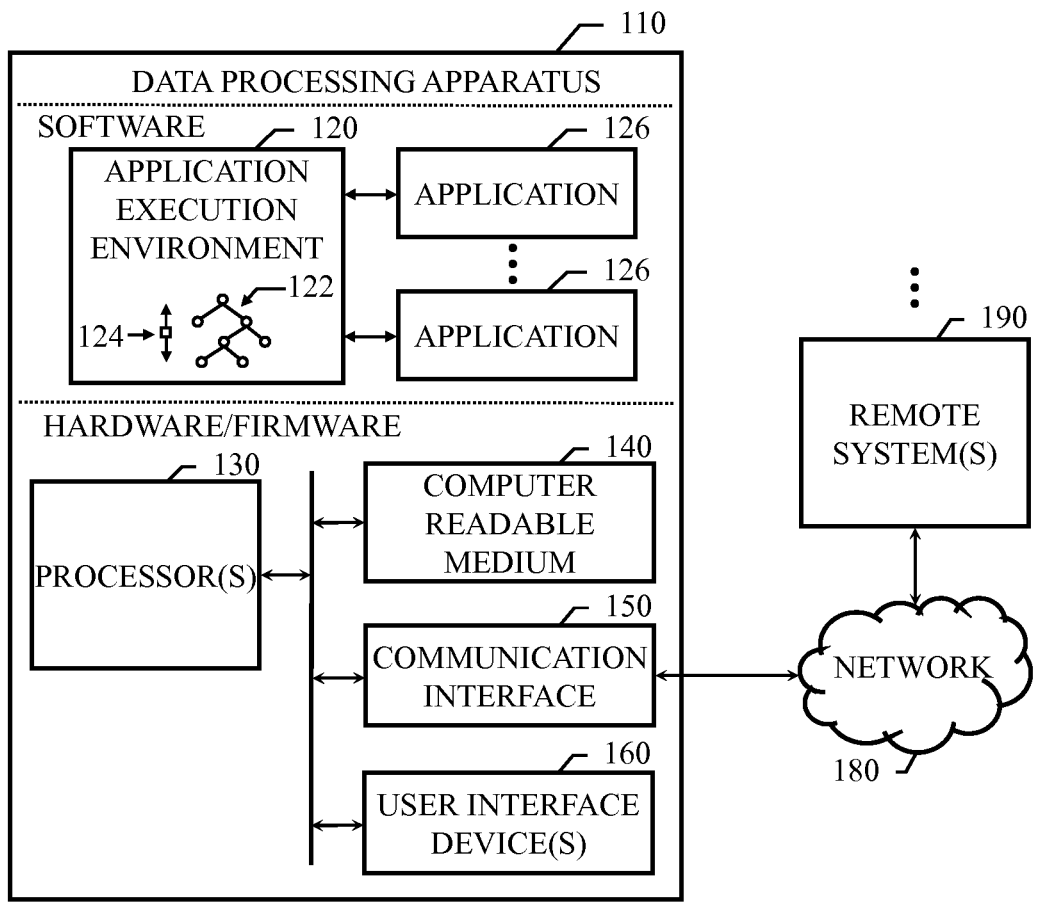
FIG. 1 shows an example system in which event flow in a user interface hierarchy is secured.

FIG. 1 shows an example system in which event flow in a user interface hierarchy is secured. A data processing apparatus 110 can include hardware/firmware, which provides the hardware platform, and software that runs on this hardware platform. The data processing apparatus 110 includes one or more processors 130 and at least one computer-readable medium 140. The data processing apparatus 110 can also include a communication interface 150, and one or more user interface devices 160. The user interface device(s) 160 can include display screen(s), keyboard(s), mouse, stylus, other user input/output devices, or any combination thereof. Moreover, the data processing apparatus 110 can itself be considered a user interface device, such as when the software that effects the subject matter described herein is provided (in whole or in part) by one or more remote systems 190 (e.g., a server farm) over a data communication network 180 (e.g., the Internet). Thus, the apparatus 110 represents multiple types of computing systems, including, for example, a personal computer running a web browser or a mobile telephone running a Wireless Application Protocol (WAP) browser.

The software includes an application execution environment 120 that allows creation and presentation of user interface elements by multiple software applications 126. As used herein, "software application" and "application" refer to a computer program that functions as a distinct computer tool used for a defined purpose, and includes applications that can be plugged into other applications to form a composite application. The application execution environment 120 provides a software platform on which the applications 126 run, and the application execution environment 120 also provides a hierarchical structure 122 of nodes corresponding to user interface objects representing elements of a user interface, where the hierarchical structure 122 governs propagation 124 of user interface events among the user interface objects. The hierarchical structure 122 can itself be the hierarchy of user interface elements, or the hierarchical structure 122 can merely correspond to (and govern the use of) the hierarchy of user interface elements. Moreover, the user interface objects can make up a generalized interface hierarchy, or the user interface objects can specify drawing primitives for a graphical user interface (e.g., the user interface element hierarchy can be a display list structure that includes user interface elements, such as buttons and text input fields).

In any case, the application execution environment enables the separate software applications 126 to concurrently create nodes in the hierarchical structure 122 and share a user interface for the data processing apparatus 110 (e.g., multiple applications 126 can share a single window in a graphical user interface). The separate software applications 126 can be mutually distrusting applications, written by mutually distrusting parties, but can nonetheless share a user interface element hierarchy. User input events, or other targeted events, can be dispatched using a hierarchical capture/bubble system, and event flow across application boundaries can be restricted by the application execution environment 120 based on established trust relationships among the applications 126, where the trust relationships can be either implicit or explicit, and where the trust relationships can be specific to event flow or more generally applicable to multiple types of inter-application communication.

The application execution environment 120 can be a virtualization environment that works in conjunction with native services (e.g., an operating system) of the data processing apparatus 110 to provide a consistent well-defined environment in which applications can be loaded and executed. The application execution environment 120 can include facilities such as memory management (e.g., garbage collection), standard libraries, media decoders, user interface frameworks and input-output interfaces. An application designed to run within an application execution environment can often be developed rapidly because developers can rely on the consistency of the application execution environment—even if the environment itself exists on widely varying hardware platforms.

The application execution environment 120 can load an application 126 from an encoded representation of the application. For example, the encoded representation can have a pre-defined syntactic structure such as a programming language (e.g., source code) or can include well-defined virtual instructions (e.g., platform-independent bytecode, such as Macromedia Flash® bytecode). To load applications, the application execution environment 120 can decode the encoded representation of the application 126 into instructions and can execute the instructions of the application 126. When the application execution environment 120 is designed as a virtualization environment in this manner, it can also be referred to as an interpreter or virtual machine. In addition, such an application execution environment often includes a runtime library that provides various utility services (e.g., string manipulation, networking, graphics, addressing peripherals, or other types of functionality) for use by the applications.

Figure 2:
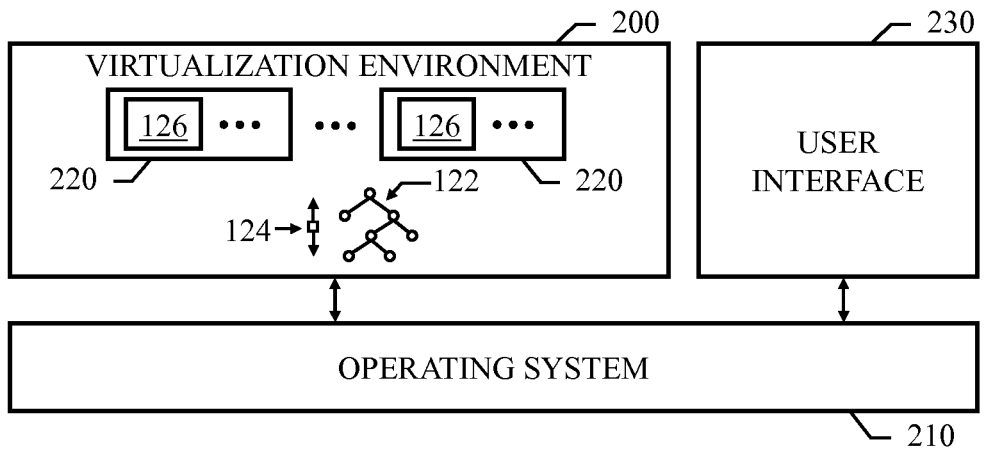
FIG. 2 shows an example of additional elements, as can be employed in the system of FIG. 1.

FIG. 2 shows an example of such a virtualization environment 200. The example environment 200 shown in FIG. 2 includes a virtual machine that works in conjunction with an operating system 210 to provide a software platform on which the separate software applications 126 run. For example, the virtualization environment 200 can be a plug-in to a web browser or a stand alone software program in the data processing apparatus 110. In addition, the example environment 200 creates one or more isolation environments 220 with which the separate software applications 126 are loaded.

When loaded and executed using an isolation environment 220, the resources that the application 126 is allowed to access are controlled by the environment 200. For example, if an application 126 is downloaded from the Internet, the application 126 may be allowed to display information and receive user input, but may not be allowed to access an attached storage device. In general, an isolation environment 220 can govern, with varying degrees of granularity, an application's access to resources (e.g., network, disk or input output devices) available through the application execution environment. Moreover, an application loaded using one isolation environment is prevented from accessing, modifying or interfering with an application loaded using a different isolation environment.

Separate applications 126 can be loaded using a common isolation environment 220 or using separate isolation environments 220. Such loading determinations can be made by the virtualization environment 200 based on classification information associated with applications (e.g., based on the network domain from which the application is loaded). Moreover, a first application loaded using a first isolation environment can import a second application using that same first isolation environment, even if the classification information for the first and second applications specify separate isolation environments. For additional details regarding such application importing, see U.S. patent application Ser. No. 11/677, 557, filed Feb. 21, 2007, and entitled "APPLICATION MANAGEMENT".

Regardless of how the applications 126 are loaded and how (and if) the isolation environments 220 are used, the environment 200 can restrict propagation 124 of user interface events among the user interface objects, during presentation of the user interface objects in a user interface 230, based on node ownership information linking the user interface objects to the separate software applications 126. A system of rules can be employed such that, if different objects in the hierarchy are owned by separate, mutually distrusting applications, event propagation can be truncated to avoid inappropriate leaks of information about user behavior. A capture/bubble event distribution mechanism can be employed, a containing application can be prevented from eavesdropping on events that occur in a contained application, and a contained application can be prevented from triggering a containing application's event-handling logic, subject to permissions managed by the environment 200.

Figure 3A:
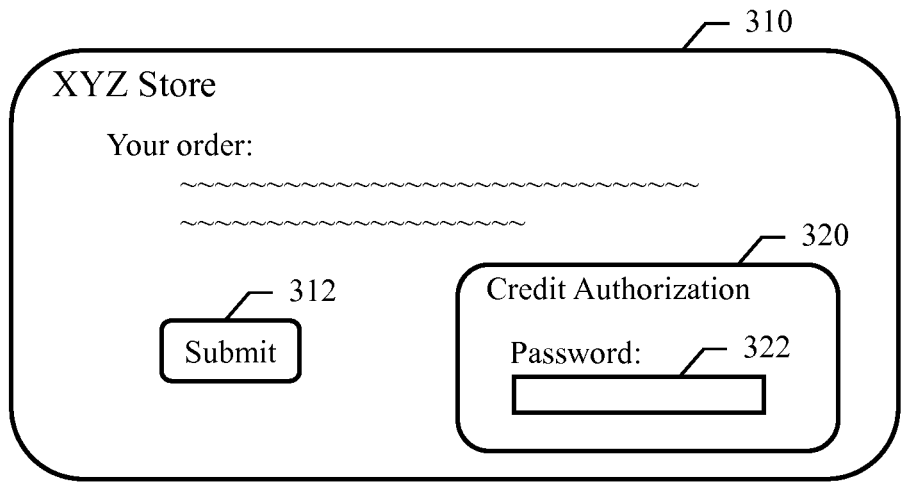
FIGS. 3A and 3B show an example user interface and user interface element hierarchy.
Figure 3B:
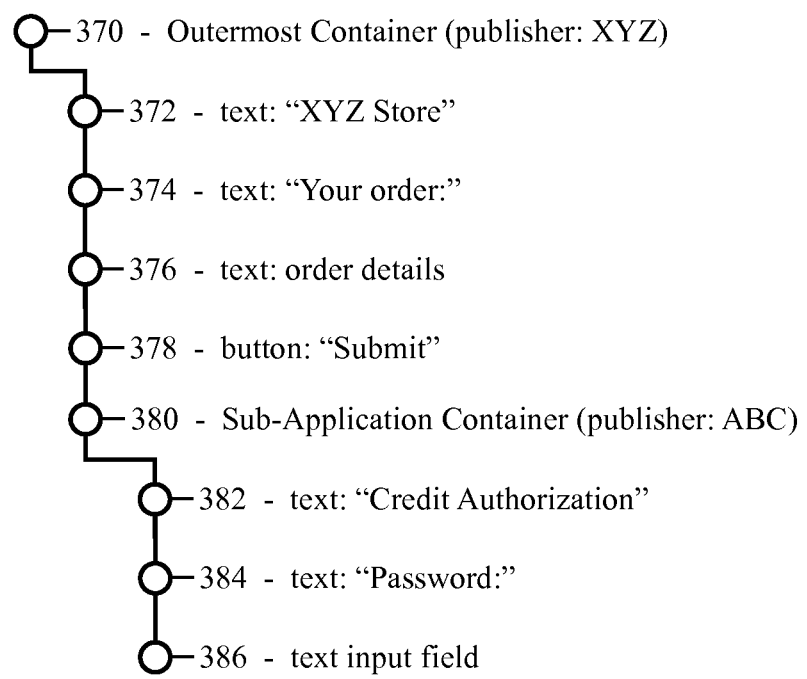

FIGS. 3A and 3B show an example user interface and user interface element hierarchy. This example user interface is composed of elements provided by multiple, potentially mutually distrusting parties. A web page 310 for an online store aggregates a financial transaction authorization tool 320. The user interface element hierarchy shown in FIG. 3B represents the user interface shown in FIG. 3A.

An outermost container node 370 corresponds to the publisher of the XYZ store and includes a first text element 372 ("XYZ Store"), a second text element 374 ("Your order"), a third text element 376 (order details), and a button element 378 ("Submit") corresponding to the button 312 in the user interface. The outermost container node 370 also includes a sub-application container node 380 corresponding to the publisher, ABC, of the financial transaction authorization tool 320. This container node 380 includes a first text element 382 ("Credit Authorization"), a second text element 384 ("Password:"), and text input field element 386 corresponding to the password field 322.

In this example, hierarchical capture/bubble event flow is described. At any time, one user interface element typically has input focus (e.g., for receiving text input from a keyboard). Events are dispatched first to any parent containers of the focused object, then to the focused object itself, and finally back to the parent containers. The first phase is called capture and gives parent containers a chance to handle events before the child objects, and optionally to halt event flow entirely (e.g., to implement a global hot key sequence). The last phase is called bubbling and gives parent containers a chance to respond to events after the child objects have already done so (e.g., to change their appearance when a child receives focus).

In the example shown, the XYZ store does not necessarily trust the ABC credit company to resist the temptation to interfere with XYZ's business, and likewise, the ABC credit company does not necessarily trust XYZ to avoid taking advantage of the transaction tool's integration. For example, consider a user interface event flow in which XYZ can defraud both ABC and the user by stealing the user's password as it is entered. When the focus is in the password field, and the user types, each keystroke results in an event. If this event passes through the XYZ-level parent container during capture or bubbling, the XYZ application can reconstruct all the characters of the user's password.

As another example, consider a user event flow in which ABC can defraud both XYZ and the user by causing the placement of an order that the user did not intend to place. If the XYZ application has defined a global hot key sequence for pressing the Submit button 312 (e.g., Control plus Enter), ABC can display the instructions, "Press Cntrl+Enter to submit your password", knowing that event capture or bubbling can cause the XYZ application to see an event that it believes represents a user instruction to place an order. Or the ABC application can simply synthesize that key press event, if the environment permits.

To prevent both scenarios, the application execution environment can enforce a rule that events may capture or bubble across publisher boundaries only if both sides (the side owning the focused object, and the side owning the higher-level container) explicitly agree to trust each other for the purpose of event flow. If both sides have not established a trust relationship for event flow, event capture and bubbling can be truncated at the publisher boundary. In the example shown, event capture can start at the sub-application container node 380, rather than the outermost container 370, the event can then be dispatched to the focused object 386, and event bubbling can stop at the sub-application container node 380, rather than continuing on up to the outermost container 370.

Figure 4:
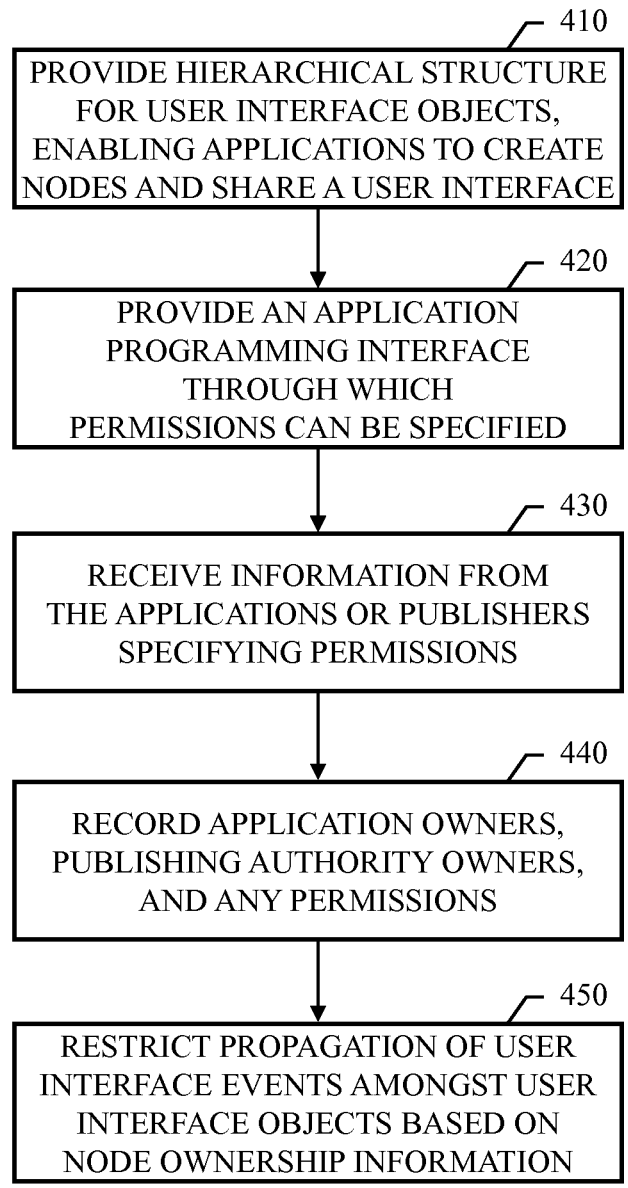
FIG. 4 shows a flow chart for an example process of securing event flow in a user interface hierarchy.

It will be appreciated that the example shown and described in connection with FIGS. 3A and 3B is but one example, and many other event flow scenarios are possible. FIG. 4 shows a flow chart for an example process of securing event flow in a user interface hierarchy. A hierarchical structure of nodes can be provided 410 by an application execution environment. The hierarchical structure of nodes corresponds to user interface objects representing elements of a user interface of a computer, where the hierarchical structure governs propagation of user interface events among the user interface objects. Moreover, providing the hierarchical structure can involve enabling separate software applications to concurrently create nodes in the hierarchical structure and share the user interface, and the application execution environment can track all user interface elements using the hierarchical structure.

The application execution environment can use the hierarchical structure to keep track of node ownership information that links the user interface objects to the separate software applications. For example, each time a new node is created in response to a request from an application, that application can be designated as the sole owner of the created node. Alternatively, the node owners can be the publishing authorities that own the applications, or the node ownership information can include both application owners and publishing authority owners.

In addition, the application execution environment can provide 420 an application programming interface (API) through which permissions can be specified, by the applications, the publishing authorities, or both. Thus, information can be received 430, through the API, from the applications or the publishing authorities, where the information specifies the permissions applicable to a specific node, to all nodes created by an application, to all nodes created by all applications of a publisher, or some combination of these.

The permissions can include permissions specific to an entire class of user interface events. By providing event related permissions, separate control can be exercised over individual event types by the various applications. For example, permissions can be established to allow a first application to monitor the progress of the mouse-controlled cursor as it hovers over the portion of the user interface used by a second application, but those same permissions can be established to prevent the first application form monitoring individual key strokes that are sent from the keyboard to a text field of the second application. Thus, the permissions can be partitioned based on event type.

In addition, the permissions can include permissions specific to an entire class of a user interface objects. The target object is the user interface object that currently has the input focus, and the permissions can be set differently for different types of target objects. For example, different permissions can be established for text fields as compared with other types of user interface objects.

In general, the permissions can be made as specific as desired, including providing the ability to individually specify permissions for any user interface object, separate from all others. For example, permissions can be set for a first text field, entitled "What is your name?", such that all events generated while this field is the target object will capture and bubble, whereas capture and bubble of events generated while a second text field, entitled "What is your password?", is the target object, are completed prevented.

Alternatively, the permissions can be fully generalized, such as a simple Boolean permissions scheme, where each application or publisher calls the API to establish a generally applicable trust relationship with a given application or publisher, and all of the user interface objects created by it. For example, the API call can be "AllowDomain(XYZ.com)" to establish a trust relationship with all applications from XYZ.com. Note also, that such API calls can be specific to event flow or more generally applicable to multiple types of inter-application communication, including the application importing described above.

Application owners, publishing owners and any specified permissions can be recorded 440, and the application execution environment can keep track of which application (and/or publishing authority) owns each user interface element that has been created, which publishing authority owns each application, and what permissions have been specified. Note that the determination of application owners and publishing owners can be implicit (e.g., based on source network domain and calling/called application), or this determination can employ the API used for specifying permissions (e.g., an API call can be used to specify the owner of a given node). Moreover, recording the node owners can involve storing a pointer to the owner application in a member variable in each node of the hierarchy.

In any case, propagation of user interface events among the user interface objects can be restricted 450, during presentation of the user interface objects in the user interface of the computer, based on the node ownership information linking the user interface objects to the separate software applications. For example, when performing a capture or bubble dispatch, the application execution environment can construct a path from the focused object up to the root of the hierarchical structure, and check the owning application at each node.

Figure 5A:
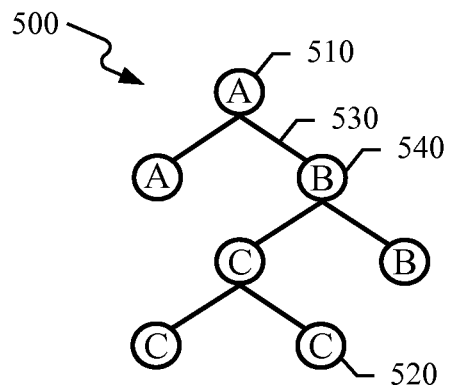
FIGS. 5A and 5B show an example hierarchical structure and corresponding stack of node owners from a target node to a root node.
Figure 5B:
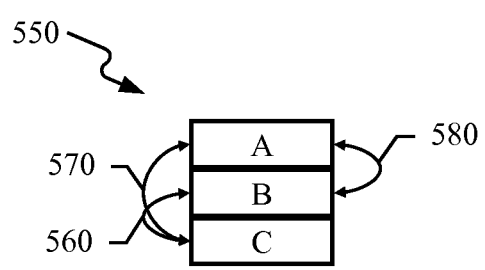

FIGS. 5A and 5B show an example hierarchical structure 500 and corresponding stack 550 of node owners from a target node 520 to a root node 510. Restricting propagation of user interface events among the user interface objects can involve checking whether a containing application/authority trusts the container application/authority, and vice versa, while traversing the path from the target node 520 to the root node 510, before performing event capturing and bubbling for the event dispatch. The node ownership information can be checked for each node in the path to look for any changes in node ownership from the target node 520 to the root node 510, and the trust relationships can be checked at each point in the path where there is a transition in node ownership from one side of the point to the other.

Conceptually, this processing can be understood as building a stack 550 of each of the distinct owners (e.g., A, B and C) of the nodes in the path from the target node 520 to the root node 510, and checking the trust relationships among these distinct owners. In practice, an actual capture/bubble stack can be constructed (e.g., a stack of the containing nodes from the structure 500, starting with the owner of the focused object and stopping after the last trusted owner has been added to the stack). Note that other data structures can be used (e.g., a queue), or, alternatively, all the processing can be performed directly using the structure 500, without building a separate data structure. Nonetheless, the processing is now described with respect to the conceptual stack structure 550.

The stack 550 includes three owners, A, B and C, corresponding to the distinct owners of the nodes in the path from the target node 520 to the root node 510. Starting at the bottom of the stack, and moving up, each new member of the stack can have its trust relationship compared with the owner at the bottom (i.e., the owner of the target node 520). Thus, a check 560 can be made to confirm there is a mutual trust relationship (or appropriate permission with respect to the current event dispatch) between B and C. Then, a check 570 can be made to confirm there is a mutual trust relationship (or appropriate permission with respect to the current event dispatch) between A and C.

When the mutual trust relationship is found to be lacking, the stack can be truncated at that boundary for purposes of the event dispatch. For example, if B and C have a mutual trust relationship with respect to the event dispatch, but A and C do not, the event dispatch can be limited at the inter-node point 530. In this example, capture will begin at node 540, and bubbling will end at node 540, rather than at the root node 510.

In addition, more stringent tests can be required. For example, a check 580 can be made to confirm there is a mutual trust relationship (or appropriate permission with respect to the current event dispatch) between A and B. For larger stacks, the checks for mutual trust relationships can be limited to checks between a current owner and both the immediately preceding owner and the original owner of the target node. In addition, the checks for mutual trust relationships can include checking for a mutual trust relationship between the current owner and each of the additional owners between the current owner and the owner of the target node.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method for integrating separate software applications in an application execution environment, the method comprising:
   providing a hierarchical structure of nodes representing a user interface of a computer, wherein the hierarchical structure governs propagation of user interface events within the user interface;
   receiving input, concurrently, from separate software applications that share the user interface, the input requesting creation of nodes in the hierarchical structure;
   creating, in response to the input, nodes in the hierarchical structure that correspond to user interface objects representing elements of the user interface, wherein the nodes corresponding to the user interface objects are associated with node ownership information linking the separate software applications to the corresponding user interface objects; and
   restricting propagation of user interface events among the user interface objects, during presentation of the user interface objects in the user interface of the computer, based on the node ownership information.

2. The method of claim 1, wherein the application execution environment comprises a virtual machine that works in conjunction with an operating system of the computer to provide a software platform on which the separate software applications run, the method comprising creating one or more isolation environments with which the separate software applications are loaded.

3. The method of claim 1, the method comprising:
   recording application owners for the nodes created in the hierarchical structure; and
   recording publishing authority owners for the separate software applications.

4. The method of claim 1, wherein the node ownership information indicates permissions granted by an owner of the node, the method comprising providing an application programming interface through which the permissions are specified.

5. The method of claim 4, the method comprising receiving from the separate applications, through the application programming interface, information specifying the permissions including at least one permission linked to a user interface event.

6. The method of claim 4, the method comprising receiving from the separate applications, through the application programming interface, information specifying the permissions including at least one permission linked to a user interface object.

7. The method of claim 1, wherein the restricting comprises, when performing an event dispatch:
   checking the node ownership information for each node in a path from a target node to a root node in the hierarchical structure, the target node corresponding to a user interface object currently having an input focus; and
   limiting the event dispatch at an inter-node point in the path where a mutual trust relationship is lacking, with respect to the event dispatch, between an owner of a current node and an owner of the target node.

8. The method of claim 7, wherein the limiting comprises limiting the event dispatch at the inter-node point in the path where a mutual trust relationship is also lacking, with respect to the event dispatch, between the owner of the current node and each additional owner of nodes between the current node and the target node.

9. The method of claim 7, wherein the owners comprise application owners and publishing authority owners.

10. The method of claim 7, the method comprising performing event capturing and bubbling for the event dispatch within a proper subset of nodes in the path as defined by the inter-node point and the target node.

11. A computer program product, encoded on a non-transitory computer-readable medium, that when executed by data processing apparatus causes the data processing apparatus to perform operations comprising:
   providing a hierarchical structure of nodes representing a user interface of a computer, wherein the hierarchical structure governs propagation of user interface events within the user interface;
   receiving input, concurrently, from separate software applications that share the user interface, the input requesting creation of nodes in the hierarchical structure;
   creating, in response to the input, nodes in the hierarchical structure that correspond to user interface objects representing elements of the user interface, wherein the nodes corresponding to the user interface objects are associated with node ownership information linking the separate software applications to the corresponding user interface objects; and
   restricting propagation of user interface events among the user interface objects, during presentation of the user interface objects in the user interface of the computer, based on the node ownership information.

12. The computer program product of claim 11, wherein the application execution environment comprises a virtual machine that works in conjunction with an operating system of the computer to provide a software platform on which the separate software applications run, the operations comprising creating one or more isolation environments with which the separate software applications are loaded.

13. The computer program product of claim 11, the operations comprising:
   recording application owners for the nodes created in the hierarchical structure; and
   recording publishing authority owners for the separate software applications.

14. The computer program product of claim 11, wherein the node ownership information indicates permissions granted by an owner of the node, the operations comprising providing an application programming interface through which the permissions are specified.

15. The computer program product of claim 14, the operations comprising receiving from the separate applications, through the application programming interface, information specifying the permissions including at least one permission linked to a user interface event.

16. The computer program product of claim 14, the operations comprising receiving from the separate applications, through the application programming interface, information specifying the permissions including at least one permission linked to a user interface object.

17. The computer program product of claim 11, wherein the restricting comprises, when performing an event dispatch:
   checking the node ownership information for each node in a path from a target node to a root node in the hierarchical structure, the target node corresponding to a user interface object currently having an input focus; and limiting the event dispatch at an inter-node point in the path where a mutual trust relationship is lacking, with respect to the event dispatch, between an owner of a current node and an owner of the target node.

18. The computer program product of claim 17, wherein the limiting comprises limiting the event dispatch at the inter-node point in the path where a mutual trust relationship is also lacking, with respect to the event dispatch, between the owner of the current node and each additional owner of nodes between the current node and the target node.

19. The computer program product of claim 17, wherein the owners comprise application owners and publishing authority owners.

20. The computer program product of claim 17, the operations comprising performing event capturing and bubbling for the event dispatch within a proper subset of nodes in the path as defined by the inter-node point and the target node.

21. A system comprising:
one or more user interface devices;
one or more processors coupled with the one or more user interface devices;
a computer-readable storage device coupled with the one or more processors and having encoded thereon instructions to effect an application execution environment;
the application execution environment providing a hierarchical structure of nodes representing a user interface for the one or more user interface devices, wherein the hierarchical structure governs propagation of user interface events within the user interface;
the application execution environment receiving input, concurrently, from separate software applications that share the user interface, the input requesting creation of nodes in the hierarchical structure;
the application execution environment creating, in response to the input, nodes in the hierarchical structure that correspond to user interface objects representing elements of the user interface, wherein the nodes corresponding to the user interface objects are associated with node ownership information linking the separate software applications to the corresponding user interface objects; and
the application execution environment restricting propagation of user interface events among the user interface objects, during presentation of the user interface objects in the user interface of the computer, based on the node ownership information.

22. The system of claim 21, wherein the application execution environment comprises a virtual machine that works in conjunction with an operating system to provide a software platform on which the separate software applications run, the application execution environment creating one or more isolation environments with which the separate software applications are loaded.

23. The system of claim 21, the application execution environment recording application owners for the nodes created in the hierarchical structure, and the application execution environment recording publishing authority owners for the separate software applications.

24. The system of claim 21, wherein the node ownership information indicates permissions granted by an owner of the node, the application execution environment providing an application programming interface through which the permissions are specified.

25. The system of claim 24, the application execution environment receiving from the separate applications, through the application programming interface, information specifying the permissions including at least one permission linked to a user interface event.

26. The system of claim 24, the application execution environment receiving from the separate applications, through the application programming interface, information specifying the permissions including at least one permission linked to a user interface object.

27. The system of claim 21, the application execution environment checking, when performing an event dispatch, the node ownership information for each node in a path from a target node to a root node in the hierarchical structure, the target node corresponding to a user interface object currently having an input focus, and to limit the event dispatch at an inter-node point in the path where a mutual trust relationship is lacking, with respect to the event dispatch, between an owner of a current node and an owner of the target node.

28. The system of claim 27, the application execution environment limiting the event dispatch at the inter-node point in the path where a mutual trust relationship is also lacking, with respect to the event dispatch, between the owner of the current node and each additional owner of nodes between the current node and the target node.

29. The system of claim 27, wherein the owners comprise application owners and publishing authority owners.

30. The system of claim 27, the application execution environment performing event capture and bubble for the event dispatch within a proper subset of nodes in the path as defined by the inter-node point and the target node.

31. The system of claim 21, wherein the one or more processors comprise one or more server processors interacting with the one or more user interface devices through a data communication network, and the one or more user interface devices are interacting with the one or more server processors as a client.

* * * * *